United States Patent
Sedlmayr

(10) Patent No.: US 10,363,943 B2
(45) Date of Patent: Jul. 30, 2019

(54) CROSS-TRAFFIC ASSISTANCE AND CONTROL

(71) Applicant: Robert Bosch GmbH, Stuttgart (DE)

(72) Inventor: Joachim Sedlmayr, West Bloomfield, MI (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/837,555

(22) Filed: Dec. 11, 2017

(65) Prior Publication Data
US 2019/0176844 A1     Jun. 13, 2019

(51) Int. Cl.
| | |
|---|---|
| *G08G 1/16* | (2006.01) |
| *B60K 31/00* | (2006.01) |
| *B60W 50/14* | (2012.01) |
| *B60W 30/17* | (2012.01) |
| *B60W 40/04* | (2006.01) |

(52) U.S. Cl.
CPC ......... *B60W 50/14* (2013.01); *B60K 31/0008* (2013.01); *B60W 30/17* (2013.01); *B60W 40/04* (2013.01); *G08G 1/167* (2013.01); *B60W 2050/143* (2013.01); *B60W 2050/146* (2013.01); *B60W 2520/10* (2013.01); *B60W 2550/10* (2013.01); *B60W 2550/20* (2013.01)

(58) Field of Classification Search
CPC ...... G08G 1/0965; G08G 1/161; G08G 1/207; G08G 1/09623; G08G 1/087; G08G 1/081; B60W 40/04; B60W 2750/30; B60W 30/08; G01C 21/26; B60T 2201/08
See application file for complete search history.

(56) References Cited

U.S. PATENT DOCUMENTS

| | | | |
|---|---|---|---|
| 5,289,181 A * | 2/1994 | Watanabe | G08G 1/0965 340/436 |
| 7,873,187 B2 | 1/2011 | Schofield et al. | |
| 8,219,298 B2 | 7/2012 | Nishira et al. | |
| 9,092,987 B2 | 7/2015 | Bone et al. | |
| 9,487,129 B2 | 11/2016 | Peterson et al. | |
| 2002/0044697 A1* | 4/2002 | Gillihan | H04N 1/40 382/254 |

(Continued)

FOREIGN PATENT DOCUMENTS

| | | |
|---|---|---|
| EP | 3021305 A2 | 5/2016 |
| EP | 3023963 A1 | 5/2016 |

*Primary Examiner* — Mirza F Alam
(74) *Attorney, Agent, or Firm* — Michael Best & Friedrich LLP

(57) ABSTRACT

Systems and methods are described for a lane crossing assistance system for a vehicle. An electronic controller is configured to automatically detect a first crossing lane intersecting with a current lane occupied by a host vehicle. The electronic controller determines, based at least in part on sensor data received from the at least one object sensor mounted on the host vehicle, whether a crossing vehicle is present in the first crossing lane and moving towards an intersection of the first crossing lane and the current lane occupied by the host vehicle. The electronic controller then calculates a first lane crossing vehicle arrival time and a first lane crossing time. A cross traffic guidance indicator is configured to produce an indication perceivable by a driver of the host vehicle that the intersection cannot be crossed by the host vehicle under current conditions.

18 Claims, 7 Drawing Sheets

(56) References Cited

U.S. PATENT DOCUMENTS

| | | | |
|---|---|---|---|
| 2008/0012726 A1* | 1/2008 | Publicover | G08G 1/095 340/932 |
| 2008/0033614 A1* | 2/2008 | Schiehlen | B62D 15/025 701/41 |
| 2008/0316055 A1* | 12/2008 | Bachelder | F41G 9/00 340/906 |
| 2010/0201508 A1* | 8/2010 | Green | B60Q 9/008 340/435 |
| 2015/0123778 A1* | 5/2015 | Konet | G08B 21/02 340/435 |
| 2016/0311464 A1 | 10/2016 | Yamaoka | |
| 2017/0008531 A1 | 1/2017 | Watanabe | |
| 2017/0217421 A1* | 8/2017 | Theodosis | B60W 10/20 |

\* cited by examiner

CROSS-TRAFFIC ASSISTANCE AND CONTROL

BACKGROUND

The present invention relates to systems and methods for monitoring traffic conditions and providing assistance and notification functionality for a vehicle.

SUMMARY

For some drivers (e.g., inexperienced drivers, elderly drivers, etc.) and in some driving conditions (e.g., inclement weather, poor light conditions, etc.), it can be difficult to judge whether there is sufficient time to cross a lane of traffic while turning or proceeding straight at an intersection. In some embodiments, the systems and methods described herein provide a system with components mounted on the front of a vehicle to detect approaching traffic from either side of the vehicle. The system can include, for example, radar, video, vehicle-to-vehicle (V2V) communication, or other object detection technology capable of detecting oncoming traffic. The system is configured to determine whether there is sufficient time for the driver to accelerate and merge into the traffic and/or to cross a traffic lane. In some embodiments, the system takes several factors into consideration in order to determine whether there is sufficient time for the host vehicle to enter traffic including, for example, a length of the vehicle including any towed objects and acceleration capabilities of the host vehicle.

In some embodiments, the system generates optical and/or acoustic signals indicating if a merger or cross-over is possible and additional advice regarding the rate of acceleration. The assistance can be provided with or without a turn signal setting and, in some implementations, a turn signal setting can be utilized by the system to more focused assistance by taking the intended direction of travel (e.g., turn left, turn right, proceed straight) into consideration. In some implementations, the system is further configured to communicate with an acceleration control system of the host vehicle in order to automatically increasing the rate of acceleration based on the observed traffic and vehicle operating conditions and/or to prevent the driver from entering the intersection by actively keeping the vehicle in the hold position (e.g., actively preventing the vehicle from accelerating from a stopped position or from its current operating speed).

In one embodiment, the invention provides a lane crossing assistance system for a vehicle. The system includes at least one object sensor, a cross traffic guidance indicator, and an electronic controller. The electronic controller is configured to automatically detect a first crossing lane intersecting with a current lane occupied by a host vehicle. The electronic controller determines, based at least in part on sensor data received from the at least one object sensor mounted on the host vehicle, whether a crossing vehicle is present in the first crossing lane and moving towards an intersection of the first crossing lane and the current lane occupied by the host vehicle. The electronic controller then calculates a first lane crossing vehicle arrival time (indicative of an amount of time until the crossing vehicle in the first crossing lane will reach the intersection) and a first lane crossing time (indicative of an amount of time required for the host vehicle to move through the intersection and across the first crossing lane). The electronic controller transmits an activation signal to the cross traffic guidance indicator in response to determining that both (a) a crossing vehicle is present in the first crossing lane and (b) that the first lane crossing time is greater than the first lane crossing vehicle arrival time (e.g., when the host vehicle will not move through the intersection before the crossing vehicle reaches the intersection). The cross traffic guidance indicator is configured to produce, in response to receiving the activation signal, an indication perceivable by a driver of the host vehicle that the intersection cannot be crossed by the host vehicle under current conditions.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
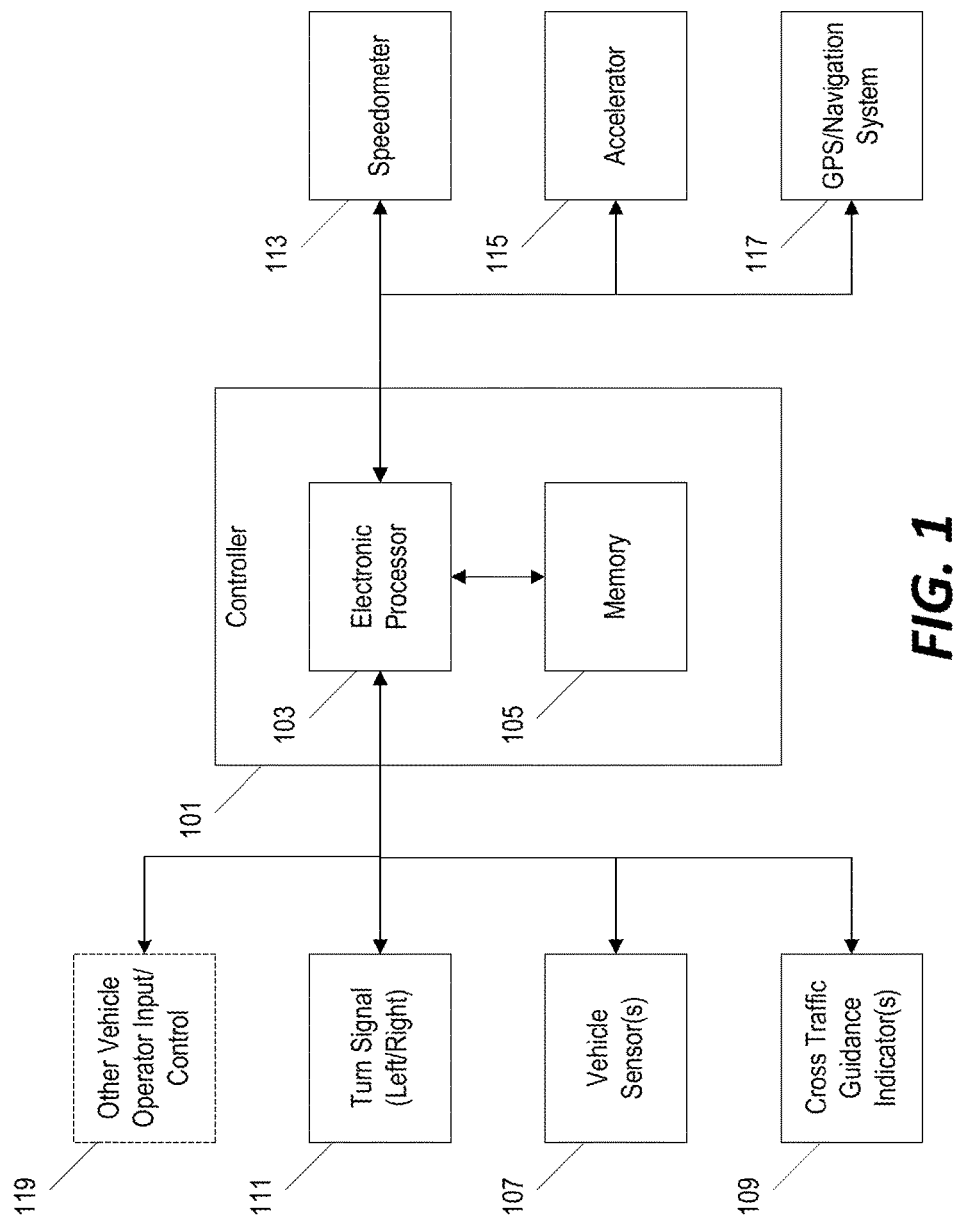
FIG. 1 is a block diagram of a lane crossing assistance system according to one embodiment.

FIG. 1 illustrates a lane crossing assistance system that includes an electronic controller 101. The controller 101 includes an electronic processor 103 and a non-transitory computer-readable memory 105. The memory 105 stores data and instructions that are executed by the electronic processor 103 to provide the functionality of the controller 101 such as described herein.

The controller 101 is communicatively coupled to one or more vehicle sensors 107. The vehicle sensors 107 are configured to monitor an area near the host vehicle to detect the presence of objects including other vehicles as discussed in further detail below. In some implementations, the vehicle sensors 107 may include one or more of a camera, a radar system, a lidar system, a sonar system, or another technology configured to directly detect the presence of another object/vehicle in a field of view of the sensor. In other implementations, the vehicle sensor 107 may include another technology configured to indirectly detect the presence of another object/vehicle. For example, the vehicles sensor 107 may include a vehicle-to-vehicle (V2V) communication system configured to detect the presence of a nearby vehicle by communicating with the nearby vehicle wirelessly. In some such implementations, the V2V communication system of the vehicle sensor 107 may be configured to transmit a message to one or more nearby vehicles indicative of a current position and travel trajectory of a host vehicle and/or to receive messages from one or more nearby vehicles indicative of a current position and/or a travel trajectory of the one or more nearby vehicles.

The controller 101 is also communicatively coupled to one or more cross-traffic guidance indicators 109. As described in further detail below, the controller 101 is configured to determine whether a host vehicle will be able to move across one or more lanes and to communicate a notification/warning to the driver or operator of a vehicle informing them of a condition regarding an intersection. For example, the cross-traffic guidance indicator 109 may be configured to provide an auditory or visual indication to the driver of a host vehicle that, based on observed conditions, the host vehicle cannot currently proceed across a lane of traffic due to an approaching vehicle. The cross-traffic guidance indicator 109 may also be configured to provide another auditory or visual indication when traffic in the intersection is clear for the host vehicle to proceed. In some implementations, the cross-traffic guidance indicator 109 may include a speaker configured to produce a tone, a series of tones, or a verbal announcement indicating when the traffic is clear and/or when the traffic is not clear. Similarly, in some implementations, the cross-traffic guidance indicator 109 may include one or more lightable icons on the dashboard of the host vehicle which are selectively activated to indicate to the driver of the host vehicle when the traffic is clear and/or when the traffic is not clear. Furthermore, in some implementations, the cross-traffic guidance indicator 109 may include or be incorporated into a graphical display unit for a vehicle that is configured to display a graphical or textual notification indicating when the traffic is clear and/or when the traffic is not clear.

In order to analyze current vehicle and traffic conditions and to determine whether the host vehicle is able to proceed through an intersection, the controller 101 is also coupled to additional vehicle sensors and control systems including, for example, a turn signal indicator 111, a speedometer 113, and an accelerator 115. As discussed in further detail below, the controller 101 may be configured to determine an expected direction of travel for the host vehicle at an intersection based on a current setting/activation status of the turn signal 111. For example, if the left turn signal is activated, the controller 101 would process available data to determine whether and when current traffic conditions would allow for the host vehicle to make a left turn. Conversely, if the right turn signal is activated, the controller 101 would process the available data to determine whether and when current traffic conditions would allow for the host vehicle to make a right turn at the intersection. Finally, if the turn signal 111 is not activated, the controller 101 would process the available data to determine whether and when current traffic conditions would allow for the host vehicle to proceed straight through the intersection.

In some implementations, the controller 101 may also be configured to monitor other vehicle operator inputs/controls 119 instead of or in addition to the turn signal 111. For example, the controller 101 may be communicatively coupled to a steering wheel sensor configured to detect a position and/or movement of the steering wheel caused by the driver of the vehicle and to transmit a signal indicative of the steering wheel position/movement to the controller 101. Examples of other vehicle operator inputs/controls 119 that may communicatively coupled to and monitored by the controller may include, for example, an accelerator pedal, a brake pedal, and/or a gear shift control.

In some implementations, the controller 101 may be configured to monitor traffic at an intersection and to provide cross-traffic assistance only when the host vehicle is stopped (or in the process of stopping) at an intersection. However, in other implementations, the controller 101 may be configured to monitor and provide assistance for maneuvering through an unregulated intersection that does not have a stop sign. In some such implementations, the controller 101 is configured to monitor a current speed of the host vehicle by communicating with the speedometer 113 and may monitor current vehicle acceleration (and acceleration capabilities) by communicating with the vehicle's accelerator 115.

In some implementations, the controller 101 may also be configured to automatically intervene with vehicle operation by sending a controller signal to one or more vehicle control systems based on the monitored condition of the intersection. For example, in some implementations, the controller 101 may be configured to transmit an acceleration prohibition signal to the accelerator 115 based on monitored traffic conditions at the intersection. In response to the acceleration prohibition signal, the host vehicle would be prevented from accelerating until the traffic condition is cleared. Accordingly, if the host vehicle is stopped at the intersection, the acceleration prohibition signal would prevent the host vehicle from moving forward into the intersection even if the driver of the host vehicle depresses the accelerator pedal. Similarly, in some implementations, the controller 101 may be configured to adjust the acceleration prohibition signal as the host vehicle approaches an unregulated intersection to maintain the host vehicle's position in a clear space in the cross traffic and preventing the driver of the host vehicle from increasing the speed of the host vehicle. Conversely, in some implementations, the controller 101 may be configured to send an accelerator control signal to the vehicle accelerator 115 causing the accelerator to increase the vehicle speed in order to move through an opening in the cross-traffic. In some implementations, the controller 101 may be configured to apply this automated acceleration control to automatically regulate the speed of the host vehicle entering traffic from a stopped position and/or to adjust the speed of the host vehicle entering traffic while moving at an unregulated intersection.

As discussed below, the controller 101 in some implementations is further configured to automatically determine when the host vehicle is approaching an intersection and/or cross traffic. In some implementations, the controller 101 is configured to detect conditions indicative of cross-traffic and/or an intersection by analyzing sensor data from the one or more vehicle sensors 107. For example, in systems that include a camera as the vehicle sensor 107, the controller 101 may be configured to analyze image data from the camera to automatically detect, for example, (a) vehicles moving in a trajectory that would cross a lane currently occupied by the host vehicle, (b) a stop sign or other physical object indicative of an intersection, or (c) visual indications of multiple traffic lanes intersecting (e.g., solid or dashed lane markings from a crossing lane). In other implementations, the controller 101 may be communicatively coupled to a GPS and/or navigation system 117 for the host vehicle. The controller 101 may be configured to receive a signal from the GPS indicating that the host vehicle is approaching an intersection and/or when a current travel plan used by the navigation system would have the vehicle move through an intersection.

Furthermore, as discussed above, the controller 101 may be configured to analyze available data differently depending on whether the host vehicle is expected to turn right, turn left, or proceed straight at the intersection. To this end, in some implementations, the controller 101 is configured to detect a condition indicative of an expectation that the host vehicle will turn left, a condition indicative of an expectation that the host vehicle will turn right, and a condition indicative of an expectation that the host vehicle will proceed straight at the intersection. As discussed above, in some implementations, the condition indicative of an expectation that the host vehicle will turn left includes an activated left turn signal, the condition indicative of an expectation that the host vehicle will turn right includes an activated right turn signal, and the condition indicative of an expectation that the host vehicle will proceed straight include an absence of an activated turn signal at the intersection. In other implementations, these conditions may be detected based at least in part on a travel route for the host vehicle as dictated by the vehicle's navigation system 117. For example, the controller 101 may be configured to interpret an output from the navigation system 117 instructing the driver to turn left at the intersection as a condition indicative of an expectation that the host vehicle will turn left at the intersection. In still other implementations, the controller 101 is configured to detect a condition indicative of an expectation that the hold vehicle will turn or proceed straight based on a monitored steering input (i.e., the angle/turning of the vehicle's steering wheel as indicated by a steering wheel sensor as the other vehicle operator input/control 119 in the example of FIG. 1).

Figure 2A:
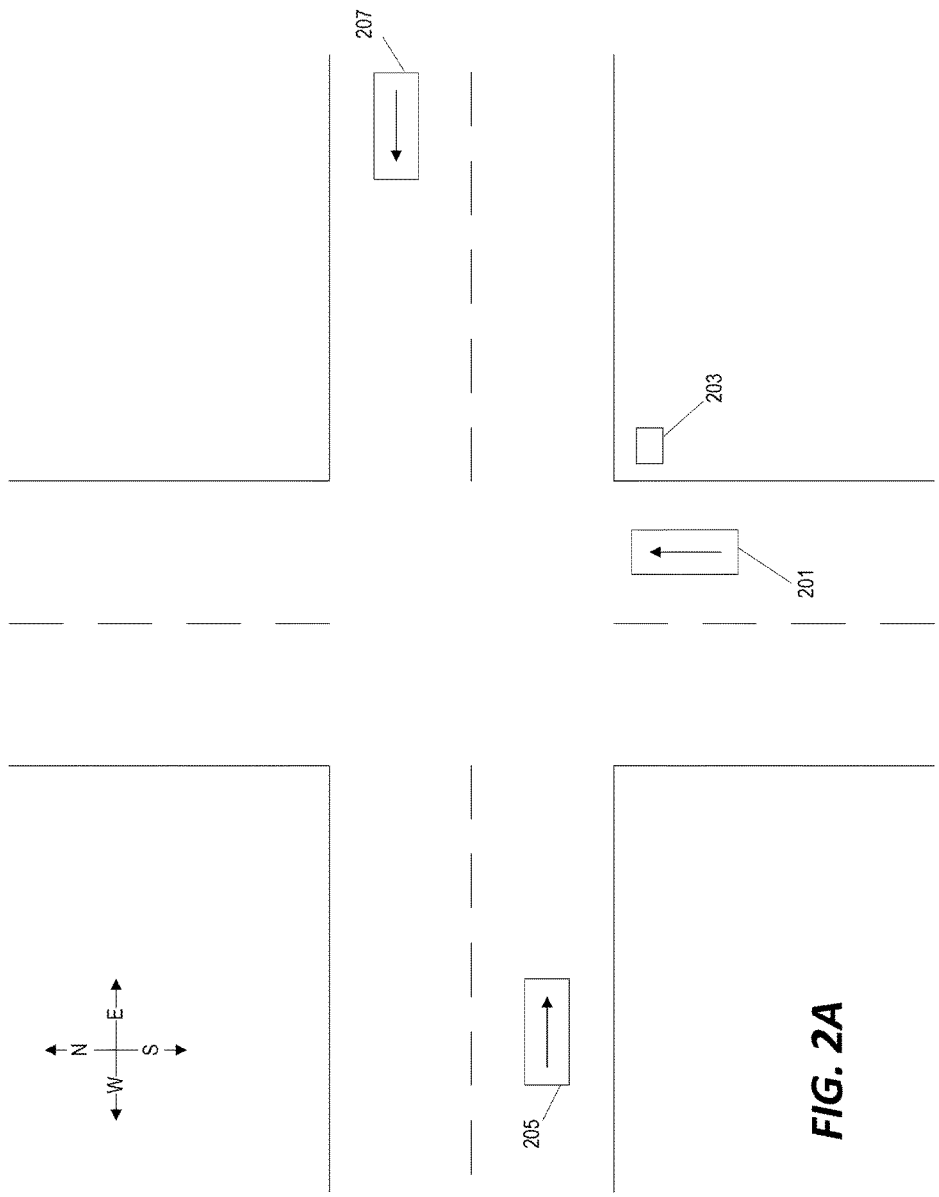
FIG. 2A is a schematic diagram of one example of a traffic situation monitored by the system of FIG. 1 in which a host vehicle is approaching an intersection with a stop sign.
Figure 2B:
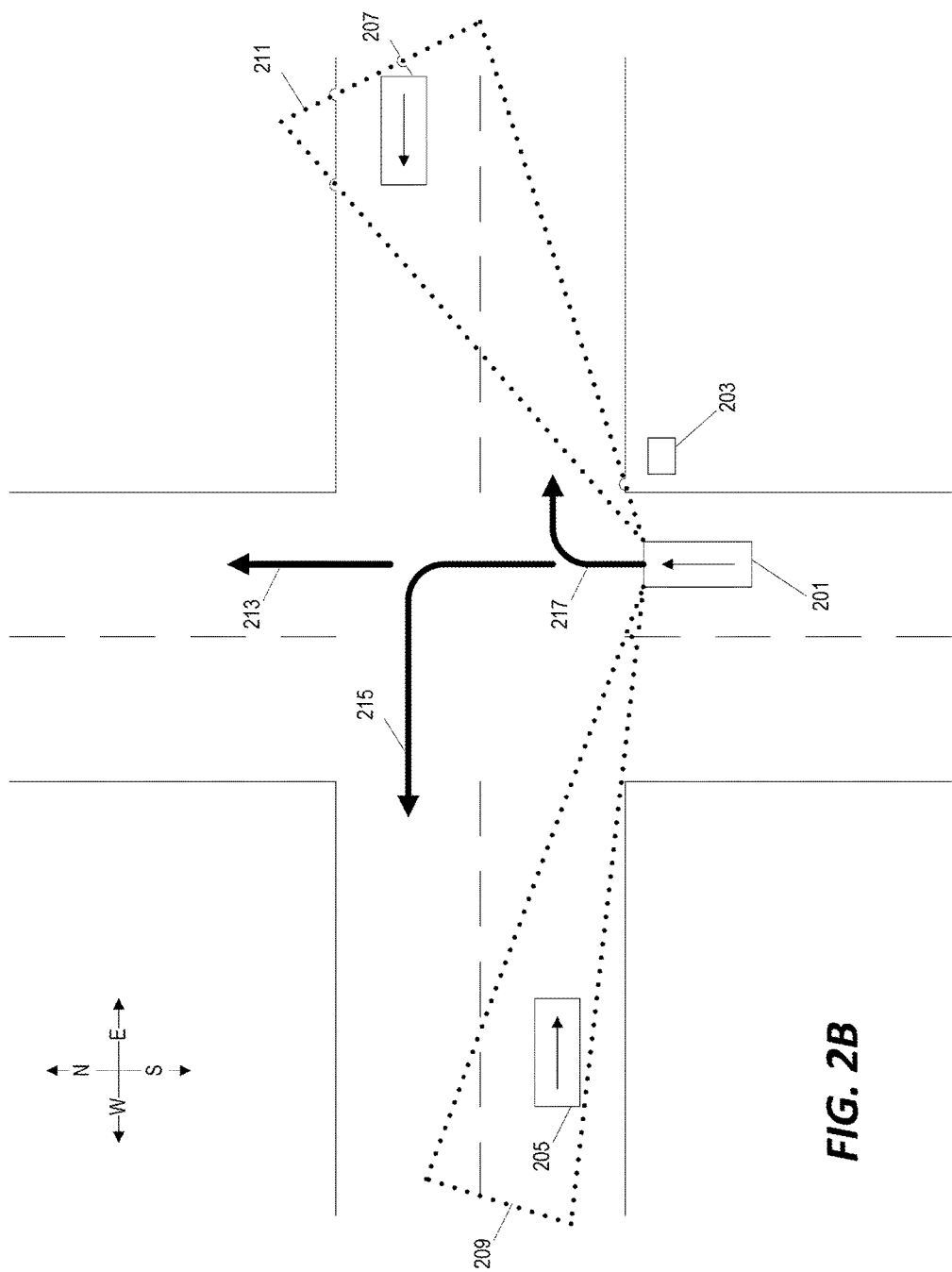
FIG. 2B is a schematic diagram of the traffic situation of FIG. 2A further indicating sensor fields of view and possible travel directions for a host vehicle.

FIG. 2A illustrates an example of a traffic situation that may be encountered by the system of FIG. 1. A host vehicle 201 is approaching an intersection while driving in a northward direction. Due to an observed stop sign 203, the driver of the host vehicle 201 has stopped at the intersection. A first crossing vehicle 205 is approaching the intersection in a first crossing lane and is moving in an eastward direction. A second crossing vehicle 207 is approaching the intersection in a section crossing lane and is moving in a westward direction. As further illustrated in FIG. 2B, the host vehicle 201 is equipped with two vehicle sensors (107 from FIG. 1). The first vehicle sensor is positioned on the host vehicle 201 to have a field of view 209 monitoring the first crossing lane. Conversely, the second vehicle sensor is positioned and configured to have a field of view 211 monitoring the second crossing lane. The system illustrated in the example of FIG. 2B is configured specifically for use in areas where traffic moves forward in the right lane. Accordingly, the field of view 209 of the first vehicle sensor is configured to monitor the first crossing lane to the left of the host vehicle 201 because traffic approaching the intersection from the left side of the host vehicle would be expected to be in the first crossing lane. In other implementations, for use in areas where traffic moves forward in the left lane, the system may be adapted so that the field of view 211 on the right side of the host vehicle 201 is configured to monitor the first crossing lane. In still other implementations, the fields of view 209, 211 are configured to be wide enough to monitor multiple crossing lanes in both directions.

At the intersection in the example of FIG. 2B, the host vehicle 201 might proceed straight through the intersection and remain in the current operating lane (trajectory 213)—in which case the host vehicle 201 would need to be able to cross both the first crossing lane (either before or after the first crossing vehicle 205) and the second crossing lane (either before or after the second crossing vehicle 207). In this case, the controller 101 would monitor the crossing lanes and determine whether the host vehicle 201 can move through the intersection before either of the crossing vehicles 205, 207 reaches the intersection.

At this same intersection, the host vehicle 201 might also turn to the left and continue through the intersection by moving in a westward direction in the second crossing lane (trajectory 215)—in which case the host vehicle 201 would need to be able to cross the first crossing lane (either before or after the first crossing vehicle 205) and establish itself operating in the second crossing lane (either before or after the second crossing vehicle 207). In this case, the controller 101 would monitor the crossing lanes and determine whether the host vehicle 201 can move through the intersection and establish itself in the second crossing lane before either of the crossing vehicles 205, 207 reaches the intersection.

Finally, the host vehicle 201 might turn to the right and continue through the intersection by moving in an eastward direction in the first crossing lane (trajectory 217)—in which case the host vehicle 201 would only need to be able to establish itself operating in the first crossing lane either before or after the first crossing vehicle 205. For the purposes of a right turn at this intersection, the position and speed of the second crossing vehicle 207 is irrelevant.

Figure 2C:
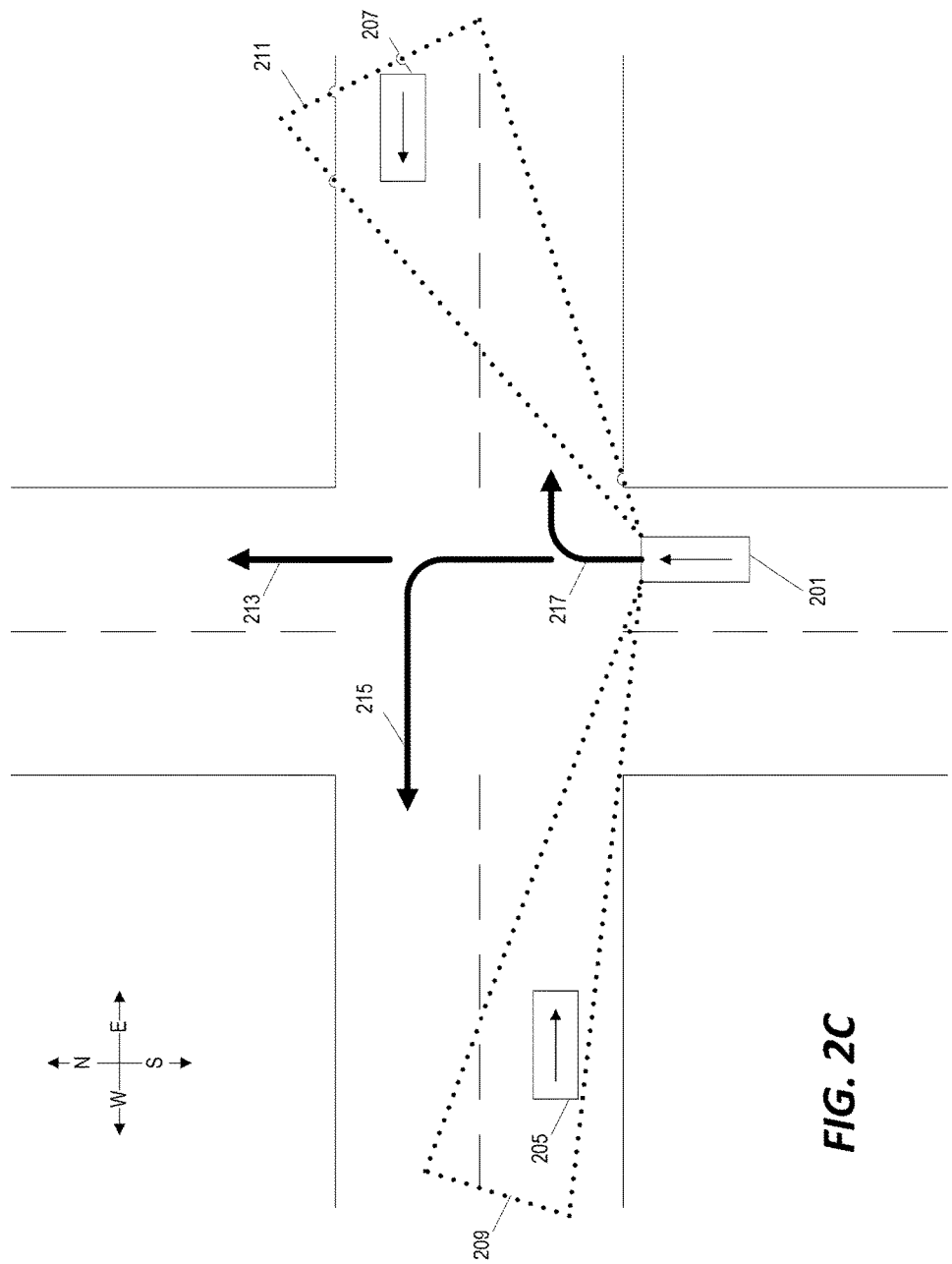
FIG. 2C is a modified example of the traffic situation of FIG. 2A in which the host vehicle is approaching an intersection without a stop sign.

In any of these three maneuvers, the controller 101 would determine whether the host vehicle 201 can accelerate from a complete stop at the stop sign 203 and cross or establish itself in the applicable crossing lanes before the crossing vehicles 205, 207 reach the intersection. However, in some implementations, the system might also be configured to monitor crossing traffic and provide assistance for host vehicle as it approaches an unregulated intersection without a stop sign as illustrated in FIG. 2C. In such implementations, the controller 101 would be configured to determine whether the host vehicle can move through the intersection while avoiding the crossing vehicles 205, 207 by either maintaining the current speed of the host vehicle 201 or by increasing/decreasing the acceleration of the host vehicle 201. In some implementations, the controller 101 is further configured to automatically cause the host vehicle 201 to increase or decrease its acceleration to a target acceleration determine to enable the host vehicle to maneuver through the intersection safely.

In some implementations, the controller 101 may also be configured to detect and monitor situations where the host vehicle will be entering (or proceeding) in a traffic lane behind another vehicle. For example, when the controller 101 determines that the host vehicle will be turning to the right and detects two other vehicles operating in the crossing lane proceeding to the right of the host vehicle. In this situation, the controller 101 would consider whether the host vehicle can safely move into the crossing lane after the first vehicle and before the second vehicle (i.e., turning right between the two crossing vehicles). The controller 101 would first determine a minimum acceleration required to safely move the host vehicle into the crossing lane before the second vehicle enters. The controller 101 would then determine a maximum acceleration that would enable the host vehicle to turn into the crossing lane behind the first vehicle. If the "maximum acceleration" exceeds the determined "minimum acceleration," then the controller 101 would instruct the user to proceed to turn between the two crossing vehicles. In some implementations, the controller 101 would then monitor the acceleration of the host vehicle and automatically increase and/or decrease the acceleration in order to maintain an acceleration between the determined "minimum acceleration" and the determined "maximum acceleration." In this way, the controller 101 might be configured to identify a safe opportunity for the host vehicle to navigate the intersection and, in some implementations, may provide automatic intervention to ensure that the host vehicle proceeds safely between other vehicles.

In some implementations, the controller 101 is configured to monitor and provide cross traffic assistance for only one possible traffic maneuver based on a determination of how the host vehicle is expected to proceed through the intersection (e.g., whether the vehicle is expected to turn left, turn right, or proceed straight). In other implementations, the controller 101 may be configured to evaluate traffic conditions for all possible maneuvers through the intersection. In such implementations, the cross-traffic guidance indicator 109 and the controller 101 may be configured to provide the notification for all possible options or to provide assistance for only one option after determining the most likely maneuver. For example, the controller 101 may determine guidance/assistance for left turn, right turn, and straight, but, based on a lack of a turn signal, determines that the host vehicle is most likely to proceed straight and, therefore, causes the cross-traffic guidance indicator 109 to output assistance based only on proceeding straight through the intersection.

Figure 2D:
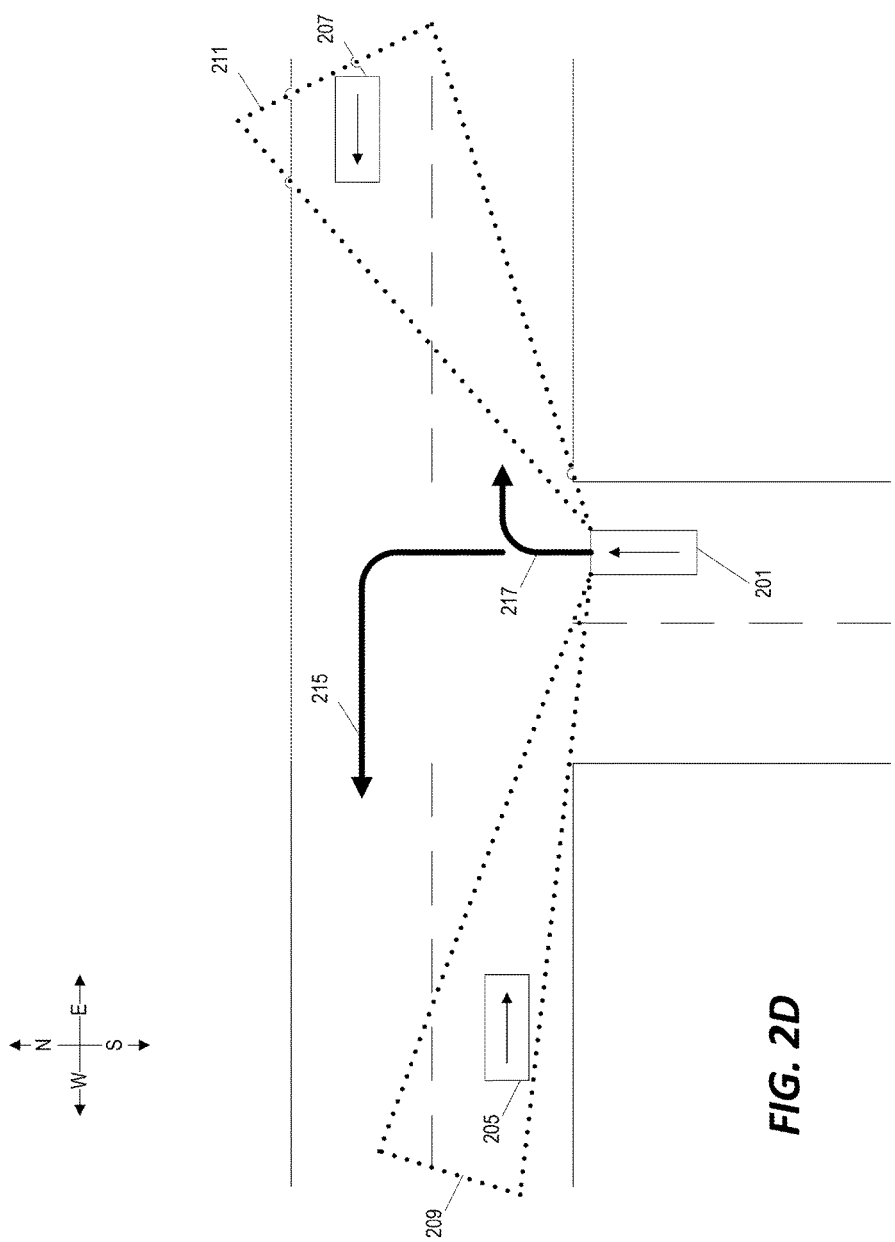
FIG. 2D is another modified example of the traffic situation of FIG. 2A in which a travel lane currently occupied by the host vehicle terminates at the intersection.

In some implementations, the controller 101 may be configured to determine that a maneuver in a particular direction is not likely or not possible based on other observed information about the intersection itself. For example, based on camera data and/or information from the GPS/navigation system 117, the controller 101 might conclude that the lane currently occupied by the host vehicle 201 terminates at an intersection as shown in the example of FIG. 2D. In some implementations, the controller 101 would be configured to utilize this information to conclude that the host vehicle 201 will likely be turning either to the left or to the right at the intersection and accordingly might not calculate or display cross-traffic information relevant to a straight crossing. The controller 101 might similarly be configured to determine whether one or more crossing lanes terminate at the intersection and may adjust its computation and/or notification output accordingly.

In some implementations, as discussed above, the controller 101 is configured to provide cross-traffic assistance based specifically on whether the host vehicle 201 were to move through the intersection by turning right, turning left, or proceeding straight. However, in other implementations, the controller 101 and the cross-traffic guidance indicator(s) 109 may be configured to determine only whether the traffic from the left and from the right is clear without regard to the intended direction of the host vehicle 201. For example, the cross-traffic guidance indicator 109 may include two lightable icons—the first indicating that traffic from the left is not clear and the second indicating that traffic from the right is not clear. The controller 101 may be configured to generate a signal that selectively activates one, both, or neither of these two lights depending on whether traffic from either direction is "clear." In still other implementations, the cross-traffic guidance indicator 109 may be configured to provide only a single "intersection clear" or "intersection not clear" notification regardless of the intended travel direction of the host vehicle and/or regardless of the direction from which the problematic cross traffic is moving towards the intersection. For example, the controller 101 might cause the "intersection not clear" icon to activate/display when a crossing vehicle from the left, from the right, or from both directions poses a collision risk and would deactivate the "intersection not clear" icon (and/or activate an "intersection clear" icon) only when cross traffic from both directions is sufficiently clear to allow the host vehicle to move through the intersection.

Figure 3A:
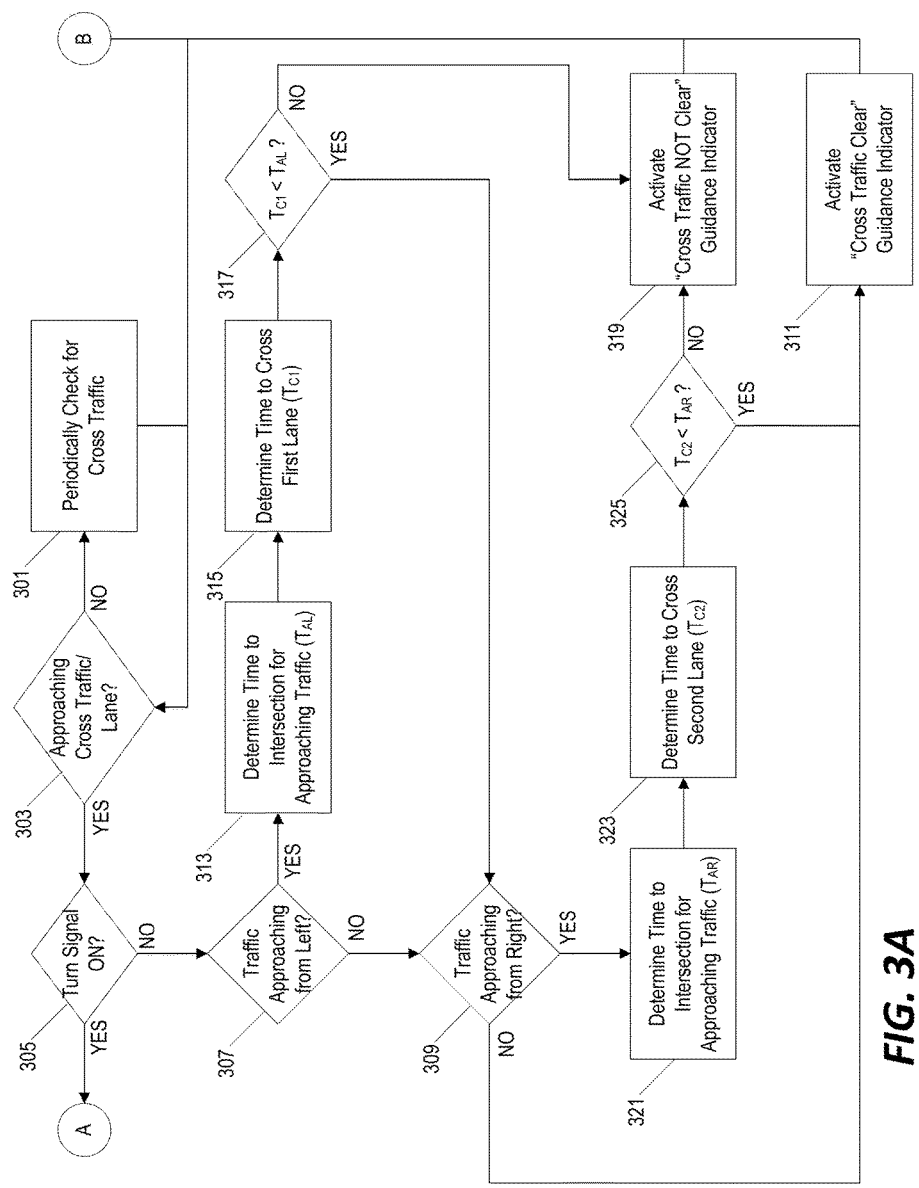
FIGS. 3A and 3B are a flowchart of a method for monitoring traffic conditions and providing vehicle operating assistance using the system of FIG. 1.
Figure 3B:
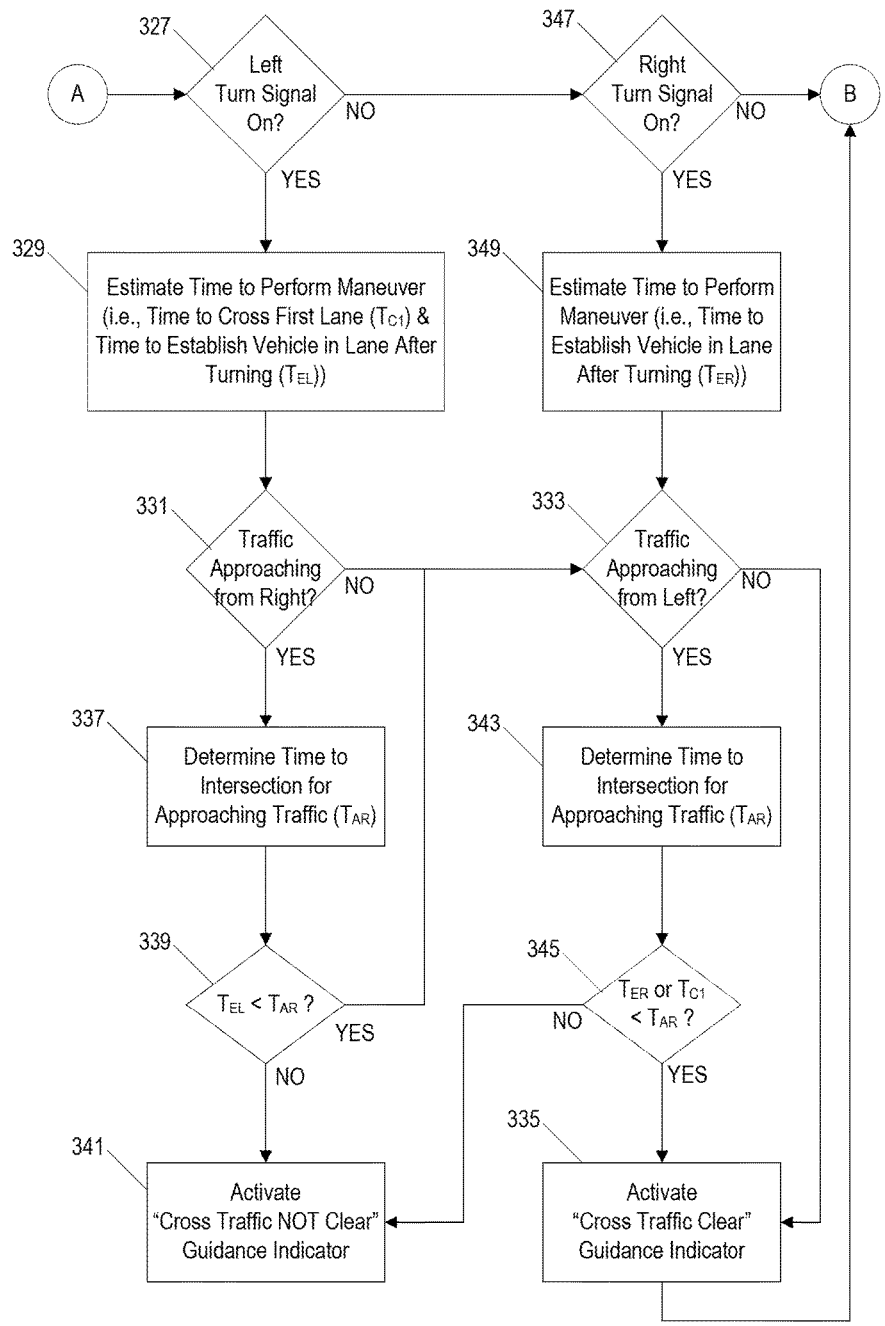

FIGS. 3A and 3B illustrate one example of a specific method by which the system of FIG. 1 detects and monitors cross-traffic at an intersection and provides driver assistance. In this example, the system is configured to periodically check cross traffic (step 301) and to determine whether the host vehicle is approach cross-traffic and/or an intersection. In other implementations, the controller 101 may be configured to automatically launch a subroutine similar to the method of FIGS. 3A and 3B in response to a trigger or interrupt indicating that an intersection and/or cross traffic is detected (e.g., a signal from a GPS/navigation system 117). Returning to the example of FIG. 3A, if the controller 101 determines that the host vehicle is not approaching cross traffic or a crossing lane (step 303), then the controller 101 continues to monitor periodically. However, if an intersection or cross traffic is detected, the controller 101 checks the status of the turn signal (step 305).

If the turn signal for the host vehicle has not been activated (step 305), the controller 101 analyzes the sensor data to determine whether cross traffic is approaching from the left (step 307) and from the right (step 309). If no cross traffic is detected in either direction, the controller 101 generates and transmits an activation signal to the cross-traffic guidance indicator 109 to activate a "cross traffic clear" guidance indicator (step 311). However, if traffic approaching the intersection from the left is detected (step 307), the controller 101 proceeds to determine an estimated time until the traffic approaching from the left will reach the intersection $T_{AL}$ (e.g., a first lane crossing vehicle arrival time) (step 313). $T_{AL}$ is calculated based at least in part on sensor data received from the vehicle sensor(s) 107 mounted on the host vehicle 201 and may account for a calculated/determined distance between the detected crossing vehicle and the intersection and a determined operating speed of the crossing vehicle. The controller 101 also calculates an amount of time needed for the host vehicle 201 to move across the first crossing lane $T_{C1}$ (e.g., a "first lane crossing time") (step 315). If, based on these calculations, the controller 101 determines that the host vehicle 201 cannot move across the first crossing lane before the crossing vehicle reaches the lane (step 317), the controller 101 generates and transmits a signal to the cross-traffic guidance indicator 109 to activate a "cross traffic NOT clear" guidance indicator (step 319).

Similarly, if the controller 101 determines that traffic is approaching the intersection from the right (step 309), the controller 101 determines an estimated time until the traffic approaching from the right will reach the intersection $T_{AR}$ (e.g., a second lane crossing vehicle arrival time) (step 321) and calculates an amount of time needed for the host vehicle 201 to move across the second crossing lane $T_{C2}$ (e.g., a "second lane crossing time") (step 323). Again, if, based on these calculations, the controller 101 determines that the host vehicle 201 cannot move across the second crossing lane before the crossing vehicle reaches the lane (step 325), the controller 101 generates and transmits a signal to the cross-traffic guidance indicator 109 to activate a "cross traffic NOT clear" guidance indicator (step 319).

Accordingly, as illustrated in FIG. 3A, the controller will generate and transmit an activation signal to the cross-traffic guidance indicator 109 to activate the "cross traffic clear" guidance indicator (step 311) under one of four condition: (a) no crossing vehicles are approaching from the left (step 307) or from the right (step 309), (b) a crossing vehicle is detected in the first crossing lane (step 307), but not in the second crossing lane (step 309), and the host vehicle 201 can move across the first crossing lane before the crossing vehicle in the first crossing lane reaches the intersection (step 317), (c) a crossing vehicle is detected in the second crossing lane (step 309), but not in the first crossing lane (step 307), and the host vehicle 201 can move across both crossing lanes before the crossing vehicle in the second crossing lane reaches the intersection (step 325), and (d) crossing vehicles are detected in both the first crossing lane and the second crossing lane (steps 307 and 309), but the host vehicle 201 can move across the first crossing lane before the crossing vehicle in the first crossing lane reaches the intersection (step 317) and can move across the second crossing lane before the crossing vehicle in the second crossing lane reaches the intersection (step 325).

The example of FIG. 3A is tuned to specifically determine whether the host vehicle 201 can move across each individual crossing lane before a crossing vehicle in that lane reaches the intersection. However, in some implementations, computations can be simplified by calculating only an estimated amount of time for the host vehicle to move across all of the crossing lanes at the intersection before any crossing vehicle in any crossing lane reaches the intersection. Conversely, in some implementations, the controller 101 may be configured to determine when there are more or fewer than two crossing lanes at a given intersection and may be configured to calculate a lane crossing time for each individual lane. Furthermore, in some implementations, the controller 101 may be configured to determine whether traffic is approaching the intersection in each crossing lane from either direction instead of assuming that traffic would approach the intersection from only a single direction in a given crossing lane.

As discussed above, in some implementations, the controller 101 is configured to determine only whether the host vehicle 201 is able to cross the intersection regardless of whether the driver of the host vehicle may intend to turn to the left or to the right. However, in some implementations, the controller 101 is configured to apply a different methodology depending on whether the controller 101 detects a condition indicative of an expectation that the host vehicle will turn left, turn right, or proceed straight at the intersection. One mechanism for determining this expectation is the current activation status of the turn signal of the host vehicle. Returning to the example of FIGS. 3A and 3B, if the controller 101 determines that the turn signal of the host vehicle 201 is activated (step 305) as the host vehicle 201 approaches an intersection, the controller 101 determines whether the left turn signal has been activated (step 327, FIG. 3B) or the right turn signal has been activated (step 347).

For a left turn at the intersection, the host vehicle 201 must move across the first crossing lane and establish itself in the second crossing lane (e.g., trajectory 215 in FIG. 2B). Accordingly, in response to determining that the left turn signal has been activated (step 327), the controller 101 determines a set of estimated timings for performing the left turn maneuver (step 329) including an amount of time for the host vehicle to move across the first crossing lane $T_{C1}$ and an amount of time for the host vehicle 201 to establish itself in the second crossing lane after turning $T_{EL}$.

If no traffic is approaching the intersection from the right (step 331) or from the left (step 333), then the controller 101 again generates and transmits an activation signal to the cross-traffic guidance indicator 109 to activate the "cross traffic clear" guidance indicator (step 335). However, if the controller 101 determines that traffic is approaching the intersection from the right in the second crossing lane (step 331), then the controller 101 determines an estimated amount of time until the crossing vehicle reaches the intersection $T_{AR}$ and, if the amount of time needed for the host vehicle to establish itself in the second crossing lane exceeds the amount of time until the crossing vehicle reaches the intersection (step 339), then the controller 101 generates and transmits an activation signal to the cross-traffic guidance indicator 109 to activate the "cross traffic NOT clear" guidance indicator (step 341). Similarly, if the controller 101 detects traffic approaching the intersection from the left in the first crossing lane (step 333), the controller 101 determines an estimated amount of time until the crossing vehicle reaches the intersection in the first crossing lane $T_{AR}$ (step 343). If the controller 101 determines that the host vehicle 201 would not move across the first crossing lane before the crossing vehicle operating in the first crossing lane reaches the intersection (step 345), then the controller 101 generates and transmits an activation signal to the cross-traffic guidance indicator 109 to activate the "cross traffic NOT clear" guidance indicator (step 341).

Similarly, if the controller 101 determines that the right turn signal of the host vehicle is activated (step 347), the controller 101 determines a set of estimated timings for performing the right turn maneuver (step 349) including an amount of time for the host vehicle to establish itself in the first crossing lane after turning $T_{ER}$. As discussed above, cross traffic in the second crossing lane is not relevant for determining whether the host vehicle is able to make a turn into a first crossing lane because the host vehicle 201 will not cross or move into the second crossing lane while performing the turn. Therefore, when the right signal is activated, the controller 101 in the example of FIG. 3B does not determine whether any traffic is approaching the intersection from the right in the second crossing lane (step 331). Instead, the controller 101 only determines whether traffic is approaching the intersection from the left in the first crossing lane (step 333). If there is no traffic approaching in the first crossing lane, then the controller 101 generates and transmits an activation signal to the cross-traffic guidance indicator 109 to active that "cross traffic clear" guidance indicator (step 335). However, if the controller 101 detects traffic approaching from the left (step 333), then the controller 101 determines an estimated amount of time for the crossing vehicle in the first crossing lane to reach the intersection (step 343) and determines whether the host vehicle 201 will be able to establish itself in the first crossing lane before the crossing vehicle reaches the intersection (step 345).

Thus, the invention provides, among other things, a system and method for monitoring cross-traffic at an intersection and for providing driver assistance in a host vehicle approaching the intersection. Various features and advantages are set forth in the following claims.

What is claimed is:

1. A lane crossing assistance system for a vehicle, the system comprising:
   at least one object sensor;
   a cross traffic guidance indicator; and
   an electronic controller configured to
     automatically detect a multiple lane intersection where a first crossing lane and a second crossing lane both intersect with a current lane occupied by a host vehicle, wherein vehicles operating in the first crossing lane are expected to move in a first direction and vehicles operating in the second crossing lane are expected to move in a second direction opposite the first direction;

determine, based at least in part on sensor data received from the at least one object sensor mounted on the host vehicle, whether a crossing vehicle is present in the first crossing lane and moving towards an intersection of the first crossing lane and the current lane occupied by the host vehicle;

calculate, based at least in part on the sensor data, a first lane crossing vehicle arrival time indicative of an amount of time until the crossing vehicle in the first crossing lane will reach the intersection;

calculate a first lane crossing time indicative of an amount of time required for the host vehicle to move through the intersection across the first crossing lane;

determine, based at least in part on sensor data received from the at least one object sensor, whether a crossing vehicle is present in the second crossing lane and moving towards the multiple lane intersection;

calculated, based at least in part on the sensor data, a second lane crossing vehicle arrival time indicative of an amount of time until the crossing vehicle in the second crossing lane with reach the intersection;

calculate a second lane crossing time indicative of an amount of time required for the host vehicle to move through the intersection across the second crossing lane;

transmit an activation signal to the cross traffic guidance indicator in response to determining both that a crossing vehicle is present in the first crossing lane and that the first lane crossing time is greater than the first lane crossing vehicle arrival time; and transmit the activation signal to the cross traffic guidance indicator in response to determining both that a crossing vehicle is present in the second crossing lane and that the second lane crossing time is greater than the second lane crossing vehicle arrival time, wherein the cross traffic guidance indicator is configured to produce, in response to receiving the activation signal, an indication perceivable by a driver of the host vehicle that the intersection cannot be crossed by the host vehicle under current conditions.

2. The lane crossing assistance system of claim 1, wherein the at least one object sensor includes a first object sensor and a second object sensor, wherein the first object sensor is coupled to the host vehicle with a first field of view configured to detect vehicles approaching the intersection from a first direction, and wherein the second object sensor is coupled to the host vehicle with a second field of view configured to detect vehicles approaching the intersection from a second direction opposite the first direction.

3. The lane crossing assistance system of claim 1, wherein the cross traffic guidance indicator is configured to produce, in response to receiving a second activation signal from the electronic controller, a second indication perceivable by the driver of the host vehicle that there is sufficient time for the host vehicle to cross the intersection under current conditions, and wherein the electronic controller is further configured to:
transmit the second activation signal to the cross traffic guidance indicator in response to a determination, based at least in part on the sensor data, that no crossing vehicle is present in the first crossing lane and that no crossing vehicle is present in the second crossing lane;

transmit the second activation signal to the cross traffic guidance indicator in response to a determination, based at least in part on the sensor data, that no crossing vehicle is present in the first crossing lane, that the crossing vehicle is present in the second crossing lane, and that the second lane crossing time is less than the second lane crossing vehicle arrival time;

transmit the second activation signal to the cross traffic guidance indicator in response to a determination, based at least in part on the sensor data, that no crossing vehicle is present in the second crossing lane, that the crossing vehicle is present in the first crossing lane, and that the first lane crossing time is less than the first lane crossing vehicle arrival time; and transmit the second activation signal to the cross traffic guidance indicator in response to a determination, based at least in part on the sensor data that a first crossing vehicle is present in the first crossing lane, that the first lane crossing time is less than the first lane crossing vehicle arrival time, that a second crossing vehicle is present in the second crossing lane, and that the second lane crossing time is less than the second lane crossing vehicle arrival time.

4. The lane crossing assistance system of claim 3, wherein the electronic controller is configured to detect a condition indicative of an expectation that the host vehicle will proceed through the multiple lane intersection while continuing to operate in the current lane by detecting that a turn signal of the host vehicle is not activated.

5. The lane crossing assistance system of claim 3, wherein the electronic controller is configured to detect a condition indicative of an expectation that the host vehicle will proceed through the multiple lane intersection while continuing to operate in the current lane by determining that a vehicle navigation system configured to provide turn-by-turn driving directions to an operator of the host vehicle is directing the host vehicle along a route that proceeds through the multiple lane intersection while continuing to operate in the current lane.

6. The lane crossing assistance system of claim 1, wherein the electronic controller is further configured to
detect a condition indicative of an expectation that the host vehicle will turn at the multiple lane intersection to operate in the second crossing lane after moving across the first crossing lane;

determine, in response to detecting the condition and based on the sensor data from the at least one object sensor, whether the crossing vehicle detected in the second crossing lane poses a collision risk to the host vehicle; and transmit the activation signal to the cross traffic guidance indicator in response to a determination both that the crossing vehicle is present in the second crossing lane and that the crossing vehicle present in the second crossing lane poses the collision risk to the host vehicle.

7. The lane crossing assistance system of claim 6, wherein the electronic controller is configured to detect the condition indicative of the expectation that the host vehicle will turn at the multiple lane intersection to operate in the second crossing lane after moving across the first crossing lane by detecting that a turn signal of the host vehicle is activated.

8. The lane crossing assistance system of claim 6, wherein the electronic controller is configured to detect the condition indicative of the expectation that the host vehicle will turn at the multiple lane intersection to operate in the second crossing lane after moving across the first crossing lane by determining that a vehicle navigation system configured to provide turn-by-turn driving directions to an operator of the host vehicle is directing the host vehicle along a route that turns at the multiple lane intersection and continues in the second direction.

9. The lane crossing assistance system of claim 1, wherein the indication produced by the cross traffic guidance indicator in response to receiving the activation signal includes at least one selected from a group consisting of a lighted icon on a dashboard of the host vehicle, a text-based message, and an audible sound.

10. The lane crossing assistance system of claim 1, wherein the cross traffic guidance indicator includes a first lightable icon and a second lightable icon, and wherein the cross traffic guidance indicator is configured to
light the first lightable icon in response to receiving the activation signal from the electronic controller indicating that there is sufficient time for the host vehicle to cross the intersection under the current conditions; and
light the second lightable icon in response to receiving a second activation signal from the electronic controller indicating that the intersection can be crossed by the host vehicle under the current conditions.

11. The lane crossing assistance system of claim 1, wherein the electronic controller is configured to automatically detect the multiple lane intersection based on information from a vehicle navigation system configured to provide turn-by-turn driving directions to an operator of the host vehicle.

12. The lane crossing assistance system of claim 1, wherein the electronic controller is configured to automatically detect the multiple lane intersection by
receiving image data from a camera coupled to the host vehicle with a field of view in front of the host vehicle, and
processing the received image data to detect the first crossing lane.

13. The lane crossing assistance system of claim 1, wherein the at least one object sensor includes at least one camera coupled to the host vehicle, and wherein the electronic controller is configured to determine whether the crossing vehicle is present in the first crossing lane and moving towards the intersection by analyzing the received image data.

14. The lane crossing assistance system of claim 1, wherein the at least one object sensor includes at least one distance ranging sensor selected from a group consisting of a radar sensor, a lidar sensor, and a sonar sensor.

15. The lane crossing assistance system of claim 1, wherein the at least one object sensor includes a vehicle-to-vehicle communication interface configured to receiving vehicle location information from other vehicles operating near the host vehicle.

16. The lane crossing assistance system of claim 1, wherein the electronic controller is further configured to transmit an acceleration control signal to a vehicle accelerator control system, wherein the acceleration control signal is configured to prevent the host vehicle from entering the intersection until either no crossing vehicle is detected in the first crossing lane or the first lane crossing time is greater than the first lane crossing vehicle arrival time calculated for a new crossing vehicle detected in the first crossing lane.

17. The lane crossing assistance system of claim 1, wherein the electronic controller is configured to transmit an acceleration control signal to a vehicle accelerator control system, wherein the acceleration control signal is configured to cause the vehicle accelerator control system to increase the acceleration of the vehicle to a target acceleration determined to enable the host vehicle to move through the intersection and across the first crossing lane before the crossing vehicle in the first crossing lane reaches the intersection.

18. The lane crossing assistance system of claim 1, wherein the electronic controller is configured to calculate the first lane crossing time based on at least one selected from a group consisting of a current speed of the host vehicle, predetermined acceleration capabilities of the host vehicle, a total length of the host vehicle including any towed objects, and a current location of the host vehicle relative to the intersection.

* * * * *